(12) United States Patent
Kumar et al.

(10) Patent No.: US 8,667,565 B2
(45) Date of Patent: Mar. 4, 2014

(54) SECURITY RESTRUCTURING FOR WEB MEDIA

(75) Inventors: Manish Kumar, Hyderabad (IN); Suresh Sunku, Hyderabad (IN); Rajesh Kamath, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 118 days.

(21) Appl. No.: 13/030,457

(22) Filed: Feb. 18, 2011

(65) Prior Publication Data

US 2012/0216251 A1    Aug. 23, 2012

(51) Int. Cl.
G06F 7/04 (2006.01)
G06F 15/16 (2006.01)
G06F 17/30 (2006.01)
H04L 29/06 (2006.01)

(52) U.S. Cl.
USPC .......................................................... 726/3

(58) Field of Classification Search
USPC .......................................................... 726/3
See application file for complete search history.

(56) References Cited

U.S. PATENT DOCUMENTS

2006/0253584 A1   11/2006  Dixon et al.
2009/0037976 A1*   2/2009  Teo et al. ......................... 726/1
2010/0332837 A1*  12/2010  Osterwalder ................. 713/172

OTHER PUBLICATIONS

Suneja, Bharat, "IMF: Where's the Whitelist?", Retrieved at <<http://www.exchangepedia.com/2006/12/imf-wheres-the-whitelist.html>>, Dec. 1, 2006, pp. 8.
Suneja, Bharat, "Exchange 2007 Content Filter: The Whitelist is Here!", Retrieved at <<http://exchangepedia.com/2007/01/exchange-2007-content-filter-the-whitelist-is-here.html>>, Jan. 30, 2007, pp. 13.
Sullivan, Bryan, "SDL Embraces the Web", Retrieved at <<http://msdn.microsoft.com/en-us/magazine/cc794277.aspx>>, Retrieved Date: Dec. 14, 2010, pp. 9.
Wong, et al., "Scalable Attribute-Value Extraction from Semi-Structured Text", Retrieved at <<http://ieeexplore.ieee.org/stamp/stamp.jsp?arnumber=05360422>>, IEEE International Conference on Data Mining Workshops, Dec. 28, 2009, p. 302-307.
"Prevent Cross-Site (XSS) Malicious Content", Retrieved at <<http://www.uibk.ac.at/linuxdoc/LDP/HOWTO/Secure-Programs-HOWTO/cross-site-malicious-content.html>>, Retrieved Date: Dec. 14, 2010, pp. 5.
"Facebook Share", Retrieved at <<http://developers.facebook.com/docs/share>>, Retrieved Date: Dec. 14, 2010, pp. 3.

* cited by examiner

Primary Examiner — Edan Orgad
Assistant Examiner — Harris Wang
(74) Attorney, Agent, or Firm — David Andrews; Thomas Wong; Micky Minhas

(57) ABSTRACT

User input to a web service including content from one or more media providers is subjected to a security analysis based on extracting whitelisted attributes and/or properties, the extracted attributes/properties validated, a template selected based on a source of the content, and a secure embedded code generated based on the whitelisted attributes/properties if the source is also a whitelisted source. The generated secure embedded code may then be provided as content by the web service.

20 Claims, 6 Drawing Sheets

SECURITY RESTRUCTURING FOR WEB MEDIA

BACKGROUND

With the proliferation of computer technology and networked communications, web based services have become popular tools for businesses, informational exchanges, social networking, and a wide variety of purposes. In some web service architectures, users are enabled to create, upload content, which they themselves and/or other users may access subsequently. Such content may include textual data, graphical data, audio data, video data, and comparable content.

One of the considerations for web service providers is security of their systems and their users. When a web service enables a large number of users to create content through uploading content that may be created by others, security concerns may necessitate special measures to be designed. Such content may include malicious code that may spread through the web service to other users. If no security measures are employed, a sharing based web service may become quickly a source for rapid dissemination of harmful software. Some web services may prevent their users from including third party audio/video content in their shared data through the web service. This approach may, however, reduce user satisfaction by limiting users' abilities to share content such as media from other providers.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to managing security restructuring of third party content at web services. A user input to a web service including content from one or more media providers may be subjected to a security analysis based on extracting whitelisted attributes and/or properties, the extracted attributes/properties validated, a template selected based on a source of the content, and a secure embedded code generated based on the whitelisted attributes/properties if the source is also a whitelisted source. The generated secure embedded code may then be provided as content by the web service.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
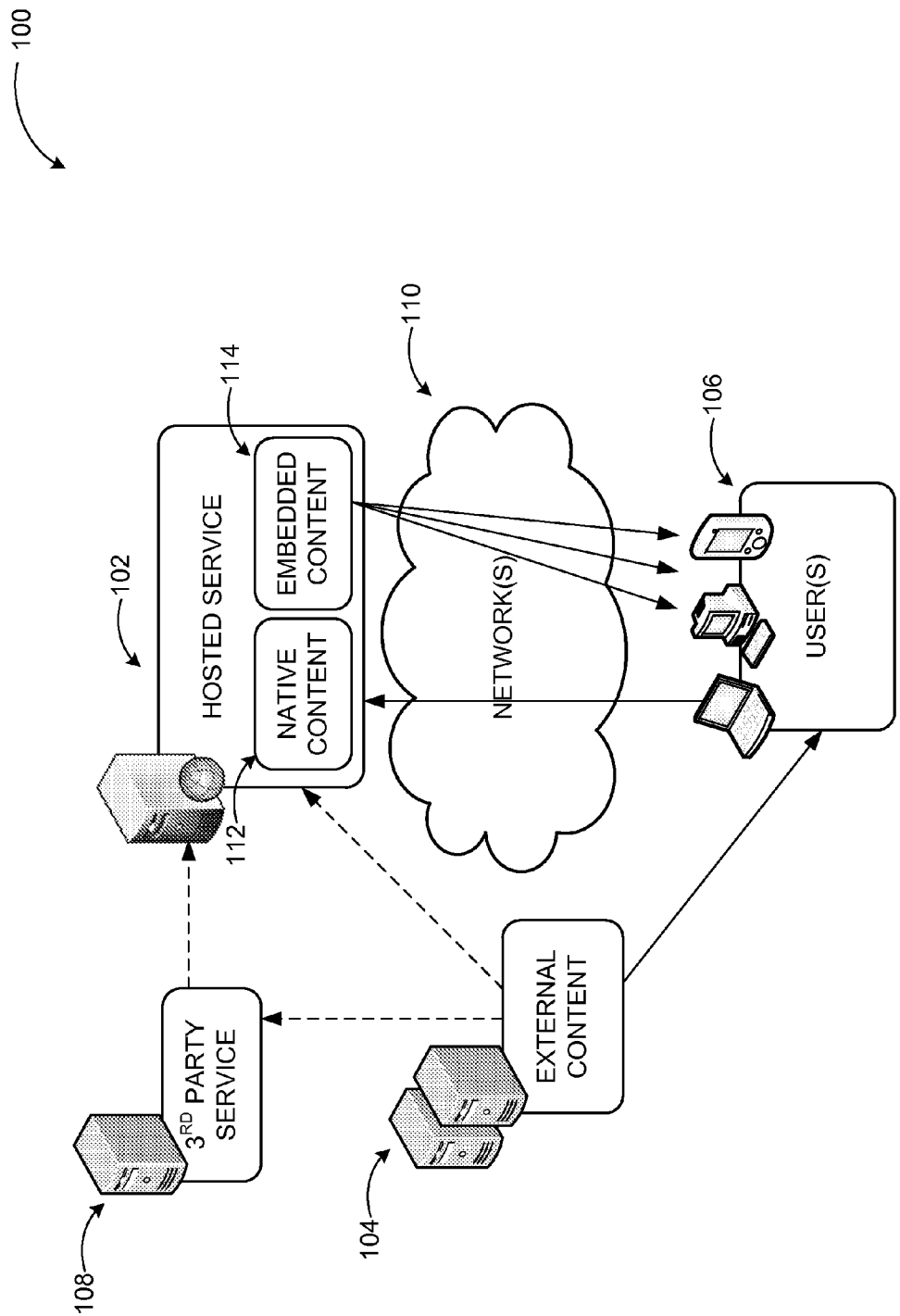
FIG. 1 illustrates an example networked system where native and embedded content may be provided according to some embodiments.

As briefly described above, user input in form of Hyper Text Markup Language (HTML) or embedded code from different media providers may be converted to secure content by extracting whitelisted attributes/properties from the user input, validating the attributes/properties against specified data types, confirming that a source of the user provided content is also whitelisted, and generating a secure embedded code based on the whitelisted attributes/properties.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable physical media.

Throughout this specification, the term "platform" may be a combination of software and hardware components for web based services enabling users to provide content. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, an example networked system is illustrated in diagram 100, where native and embedded content may be provided according to some embodiments. A system providing security restructuring for web media may be implemented in other configurations employing additional or fewer components, networks, and interactions.

As shown ion diagram 100, users 106 may access a hosted web service executed 102 on one or more servers through network(s) 110. Hosted web service 102 may provide a number of services including, but not limited to, enabling users 106 to upload content for sharing with other users. The service may also provide native content 112, which may be created by the service or by a user through the service's secure tools. Some of the content (e.g. uploaded content) may be embedded content 114. Embedded content 114 may be received by an uploading user from an external content provider 104 and provided to hosted web service 102 or directly provided to the hosted web service by a third party service 108.

The embedded content provided by users 106 may include graphics such as images, audio or video data. Many social networking sites enable their users to create and share such data in addition to textual data. However, embodiments are not limited to social networking environments. Many other types of web services including business service sites may enable users to create/upload external content. For example, a user may be enabled to upload an image of an automobile they desire to a dealer or auction website to describe the type of vehicle they want. To ensure security of uploaded media, a security restructuring system extracting whitelisted attributes/properties from the user input, validating the attributes/properties against specified data types, confirming that a source of the user provided content is also whitelisted, and generating a secure embedded code based on the whitelisted attributes/properties may be implemented according to some embodiments.

Figure 2:
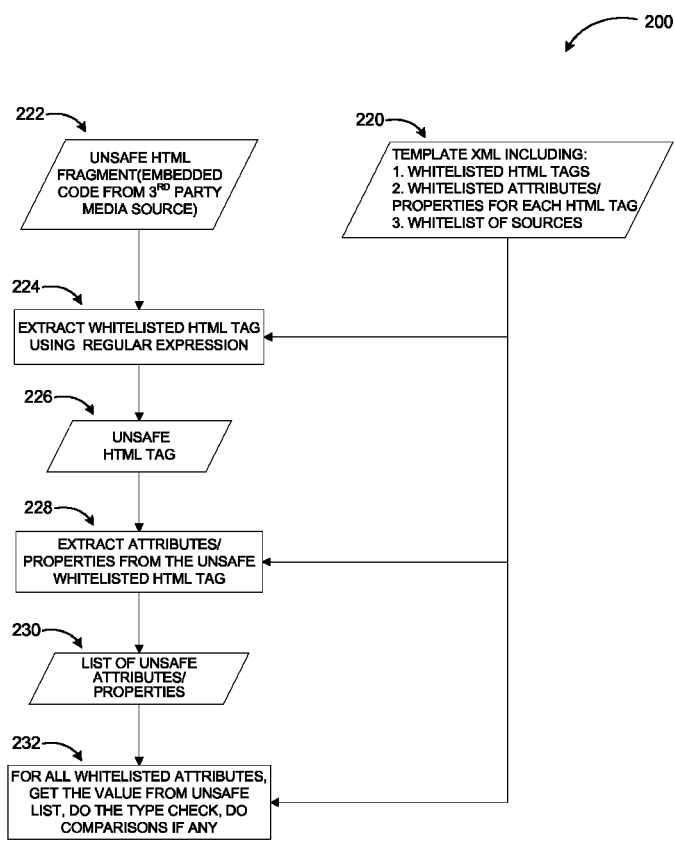
FIG. 2 illustrates an example process of using an XML template to handle unsafe HTML codes according to some embodiments.

FIG. 2 illustrates an example process 200 of using an XML template to handle unsafe HTML codes according to some embodiments. Process 200 may be performed by a web service enabling its users to upload third party provided content.

As a first step in the process 200, an unsafe HTML fragment (i.e., embedded code from a third party media source) may be received (222) and whitelisted HTML tags extracted using regular expression (224). "Unsafe" as used herein refers to security status unknown. The extraction results in unsafe (status unknown) HTML tag 226, from which attributes and/or properties may be extracted (228) resulting in the list of unsafe attributes and/or properties 230.

The attributes and/or properties in the list of unsafe attributes and/or properties 230 may be processed to perform a data type check and compare the attributes/properties against whitelisted attribute/property types in a template XML 220 at step 232. Template XML 220 may include a listing of whitelisted HTML tags such as embed, object, etc.; whitelisted attributes or properties for each tag such as src, height, width, etc.; and whitelisted sources (or domains). In a security restructuring process according to embodiments, the template XML may be source-specific and selected according to the source of the unsafe HTML fragment (or content).

Figure 3:
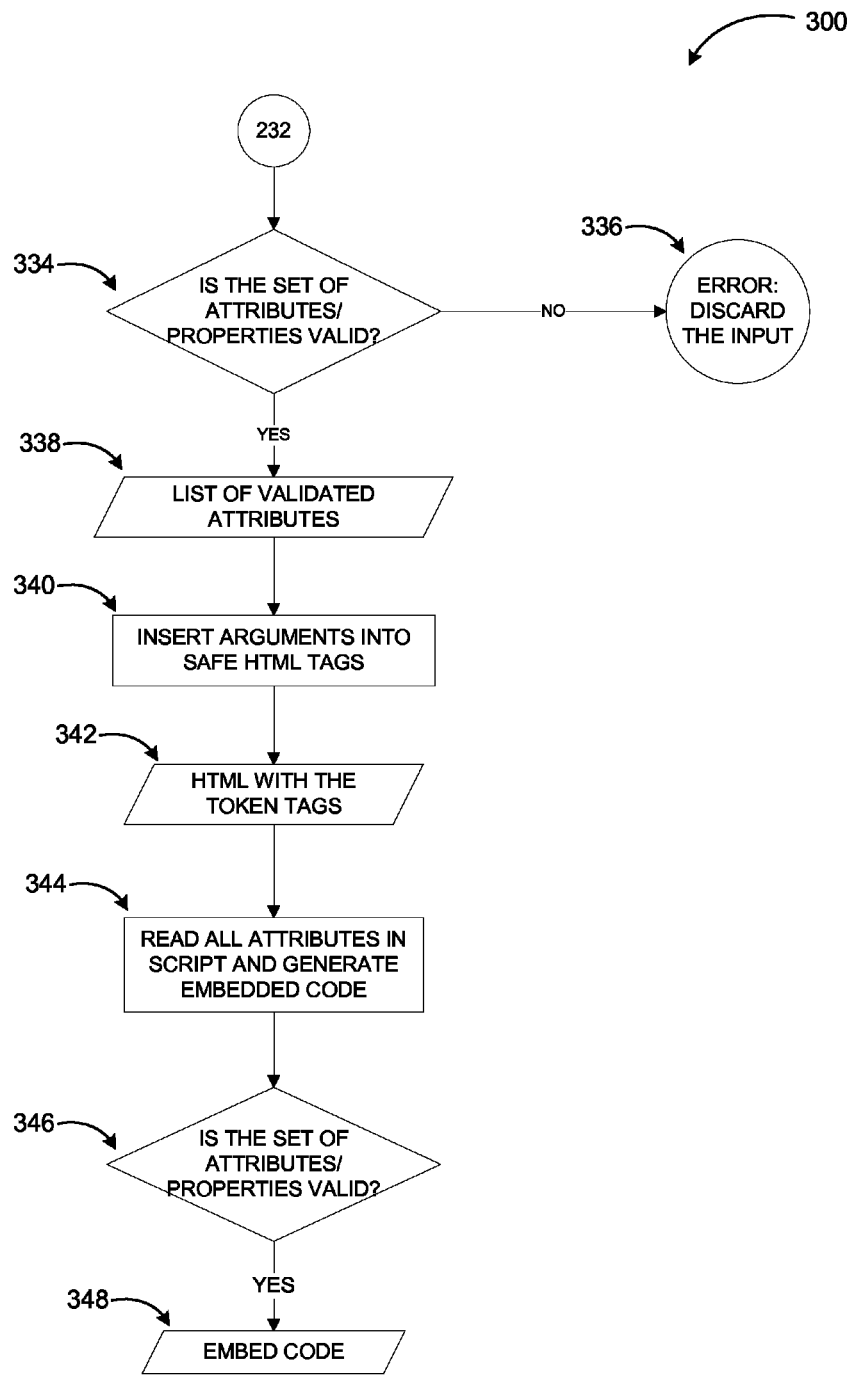
FIG. 3 illustrates a continuation of the process of FIG. 2 for generating an embedded code.

FIG. 3 illustrates a continuation of the process of FIG. 2 for generating an embedded code. Process 300 shown in FIG. 3 continues from step 232 of process 200. At step 334, a determination may be made whether the set of attributes and/or properties extracted previously are valid. If the attributes and/or properties are not valid, an error may be issued (336) and the user input discarded.

If the attributes and/or properties are valid, a list of validated attributes/properties 338 is generated, which are inserted as arguments into safe HTML tags (e.g., div, anchor, span, etc.) at a safety check component of the system (340). The resulting HTML 342 with the token tags may be used to read the attributes at a script component and generate a secure embed code (344) based on the whitelisted attributes/properties.

An optional validation 346 may be performed on the generated secure embed code confirming that the attributes/properties are valid, and if so, the embed code 348 may be included as available content at the web service. Of course, additional operations may be performed depending on type of content, source, user, etc. For example, additional security features may be included in the new content.

The example systems and processes in FIG. 1 through 3 have been described with specific components, data types, and interactions. Embodiments are not limited to systems according to these example configurations. A web based system with security restructuring for third party content may be implemented in configurations employing fewer or additional components and performing other tasks. Furthermore, specific protocols and/or interfaces may be implemented in a similar manner using the principles described herein.

Figure 4:
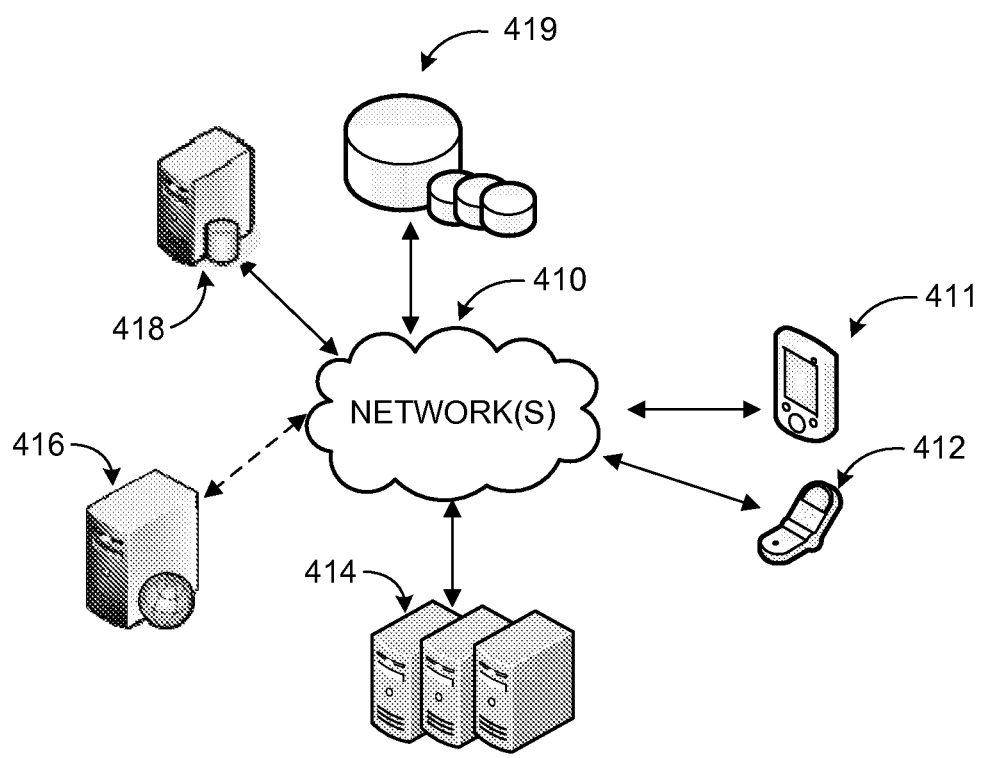
FIG. 4 is a networked environment, where a system according to embodiments may be implemented.

FIG. 4 is an example networked environment, where embodiments may be implemented. Security restructuring for web media may be implemented via software executed over one or more servers 416 such as a hosted web service. The platform may communicate with client applications on individual computing devices such as a handheld computing device 411 and smart phone 412 ('client devices') through network(s) 410.

Client applications executed on any of the client devices 411-412 may facilitate interaction with the web service executed by servers 414, or on individual server 416. An application executed on one of the servers may provide a user interface for users to upload content, which may include content from third party providers. Security of the third party provided content may be ensured through a restructuring of the content using whitelisted attributes, properties, and sources and regenerating secure embedded code with tags that include whitelisted attributes/properties as described herein. The web service may retrieve relevant data from data store(s) 419 directly or through database server 418, and provide requested services (e.g. content sharing) to the user(s) through client devices 411-412.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform providing security restructuring for web media in a web service environment. Furthermore, the networked environments discussed in FIG. 4 are for illustration purposes only. Embodiments are not limited to the example applications, modules, or processes.

Figure 5:
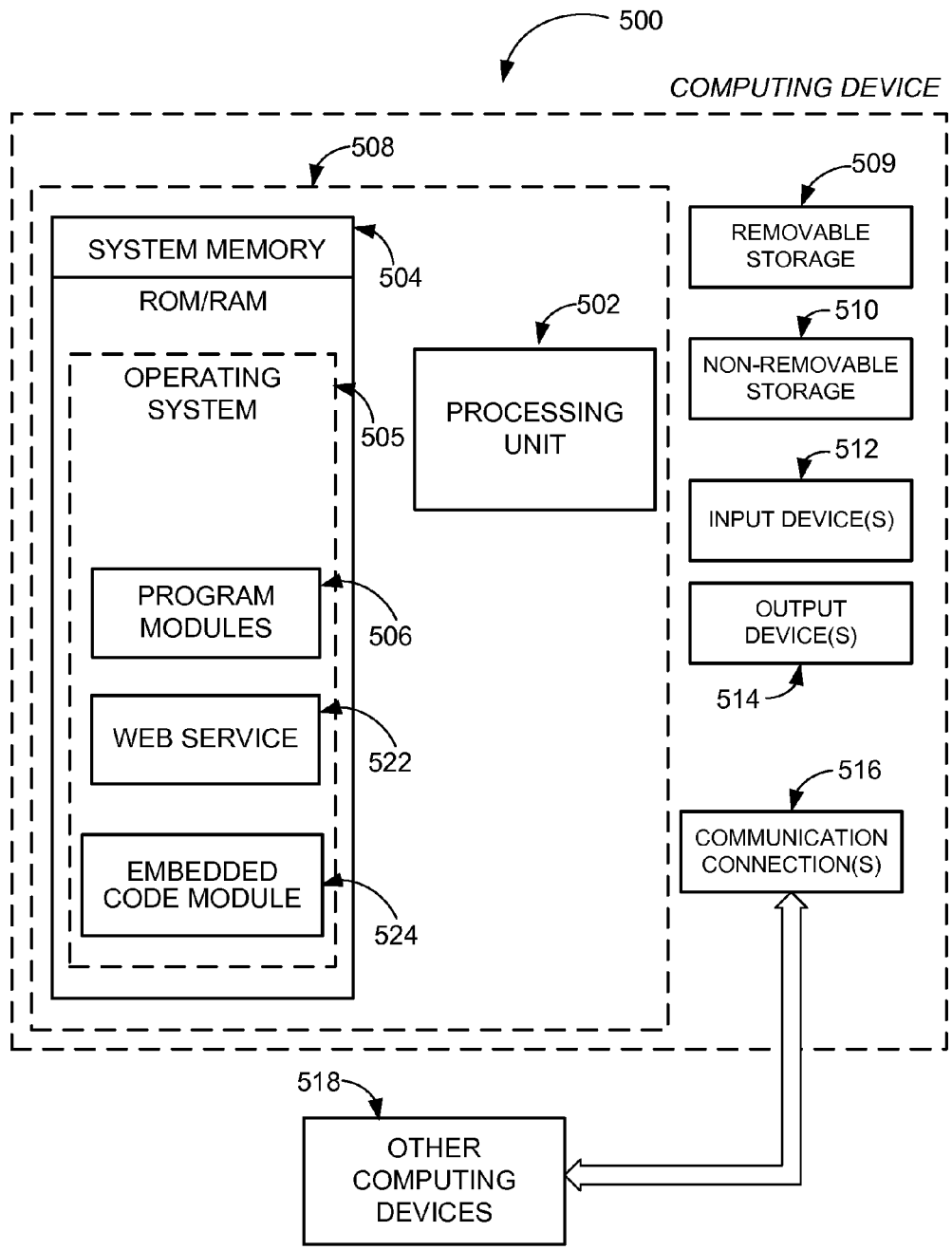
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing a web application according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash.

The system memory 504 may also include one or more software applications such as program modules 506, web service 522, and embedded code module 524. Web service 522 may provide a variety of web based service and may represent an umbrella structure for a plurality of coordinated applications. Embedded code module 524 may analyze and restructure content from third party providers to ensure security employing whitelisted attributes, properties, and sources as described herein. Web service 522 and embedded code module 524 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
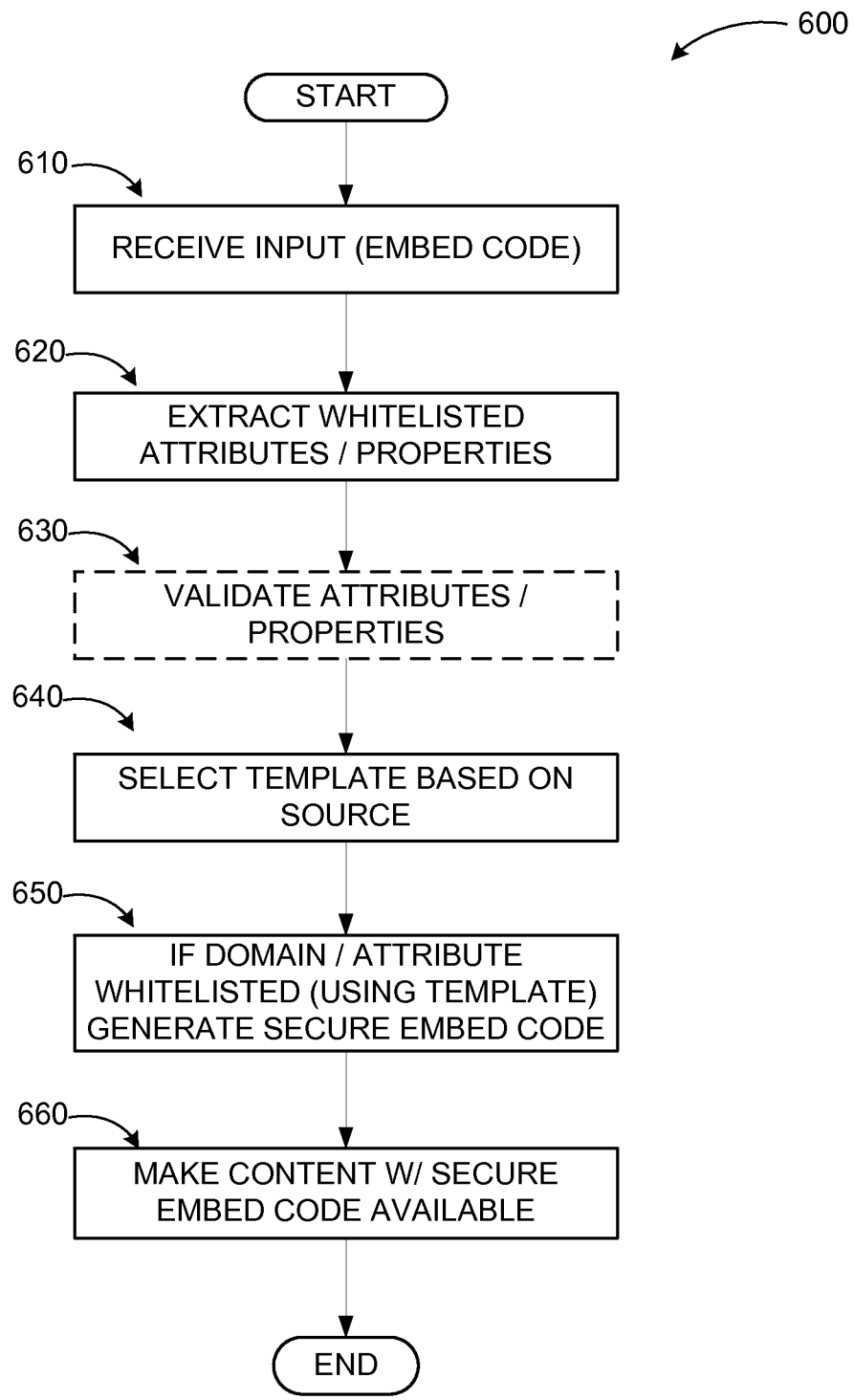
FIG. 6 illustrates a logic flow diagram for a process of security restructuring for web media according to embodiments.

FIG. 6 illustrates a logic flow diagram for process 600 of security restructuring for web media according to embodiments. Process 600 may be implemented on a server executing one or more applications associated with a web service.

Process 600 begins with operation 610, where a user input with a third party provided content (embed code) is received. Whitelisted attributes and/or properties may be extracted from the received input by parsing the input at operation 620 and optionally validated at operation 630. The whitelisted attributes/properties may be obtained from a template selected at operation 630 (or earlier) based on a source of the content in the input. For example, the source may be a domain of the content (e.g., www.myexamplesource.com). The attributes/properties may also be domain-specific. According to some embodiments, the whitelisted attributes and the whitelisted properties may be determined based on a database maintained by the web service or a third party verification service.

If the domain and extracted attributes/properties are whitelisted based on the selected template, a secure embed code may be generated by inserting the attributes/properties into safe HTML tags at operation 650. Subsequently, the content with the secure embed code may be rendered available at operation 660. The secure embedded content may also be saved a hyperlink.

The operations included in process 600 are for illustration purposes. Security restructuring for web media in a web service environment may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for managing security in conjunction with embedded code in web based services, the method comprising:

receiving an input that includes third party content at an embedded code module configured to analyze and restructure the third party content to ensure security employing one or more of: whitelisted attributes, properties and sources;

extracting at least one whitelisted attribute from the third party content;

validating the at least one extracted attribute by a security analysis based on the extracted at least one whitelisted attribute;

if a source of the third party content is a whitelisted source, selecting a template based on the source, else discard the input; generating a secure embedded code based on the third party content in the input employing the selected template at a safety check component by inserting the attributes and properties as arguments into one or more safe HTML tags for storage of the attributes and properties on the one or more safe HTML tags, wherein a safe HTML tag includes one or more of: a "div" tag, an "anchor" tag, and a "span" tag; and employing the one or more safe HTML tags to read attributes at a script component.

2. The method of claim 1, further comprising:
rendering content based on the secure embedded code available through the web service.

3. The method of claim 1, further comprising:
extracting at least one whitelisted property from the third party content; and
validating the at least one extracted property.

4. The method of claim 3, further comprising:
validating the at least one extracted attribute and property through a comparison against a specified data type.

5. The method of claim 1, further comprising:
if the source of the third party content is not whitelisted, discarding the input.

6. The method of claim 1, wherein the content includes at least one of audio and video data provided through one of a Hyper Text Markup Language (HTML) link and an embedded code.

7. The method of claim 1, further comprising:
storing attributes of the secure embedded code as attributes on one or more safe HTML tags.

8. The method of claim 7, wherein the safe HTML tags include at least one from a set of a "div" tag, an "anchor" tag, and a "span" tag.

9. The method of claim 7, wherein storing the attributes of the secure embedded code further comprises:
reading the attributes of the secure embedded code by a script component; and
constructing the safe HTML tags by the script component.

10. The method of claim 1, wherein the source of the third party content is a domain.

11. A computing device for providing a web service capable of managing security in conjunction with embedded code, the computing device comprising:
a memory configured to store instructions; and
a processor coupled to the memory for executing the stored instructions, the processor configured to:
receive an input that includes third party content at an embedded code module configured to analyze and restructure the third party content to ensure security employing one or more of: whitelisted attributes, properties and sources;
extract at least one whitelisted attribute from the third party content;
validate the at least one extracted attribute by a security analysis based on the extracted at least one whitelisted attribute;
if a source of the third party content is a whitelisted source, select a template based on the source, else discard the input;
generate a secure embedded code based on the third party content in the input employing the selected template at a safety check component by inserting the attributes and properties as arguments into one or more safe HTML tags for storage of the attributes and properties on the one or more safe HTML tags, wherein a safe HTML tag includes one or more of: a "div" tag, an "anchor" tag, and a "span" tag; and
employ the one or more safe HTML tags to read attributes at a script component.

12. The computing device of claim 11, wherein the processor is further configured to parse the input to extract whitelisted attributes and properties, and discard a remainder of the input.

13. The computing device of claim 11, wherein the processor is further configured to generate the secure embedded code based on an output content of the selected template.

14. The computing device of claim 11, wherein the secure embedded code includes at least one additional security property.

15. The computing device of claim 11, wherein the source of the third party content is a domain and the at least one attribute is domain-specific.

16. The computing device of claim 11, wherein the processor is further configured to compare the at least one attribute to a data type specified by the selected template to validate the attribute.

17. A computer-readable memory device with instructions stored thereon for managing security in conjunction with embedded code in web based services, the instructions comprising:
receiving an input that includes third party content at an embedded code module configured to analyze and restructure the third party content to ensure security employing one or more of: whitelisted attributes, properties and sources;
extracting at least one whitelisted attribute from the third party content;
validating the at least one extracted attribute by a security analysis based on the extracted at least one whitelisted attribute;
if a source of the third party content is a whitelisted source, selecting a template based on the source, else discard the input; generating a secure embedded code based on the third party content in the input employing the selected template at a safety check component by inserting the attributes and properties as arguments into one or more safe HTML tags for storage of the attributes and properties on the one or more safe HTML tags, wherein a safe HTML tag includes one or more of: a "div" tag, an "anchor" tag, and a "span" tag; and employing the one or more safe HTML tags to read attributes at a script component.

18. The computer-readable memory device of claim 17, wherein the whitelisted attributes and the whitelisted properties are determined based on one of: a database maintained by the web service and a third party verification service.

19. The computer-readable memory device of claim 17, wherein the selected template includes at least one from a set of: one or more whitelisted HTML tags, one or more HTML tag attributes, one or more HTML tag properties, and one or more whitelisted domains.

20. The computer-readable memory device of claim 17, wherein the content based on the secure embedded content is saved a hyperlink.

\* \* \* \* \*